Aug. 8, 1967  E. KÜSTERS ET AL  3,334,391
APPARATUS FOR STRETCHING TUBULAR ARTICLES
Filed Sept. 3, 1964  2 Sheets-Sheet 1
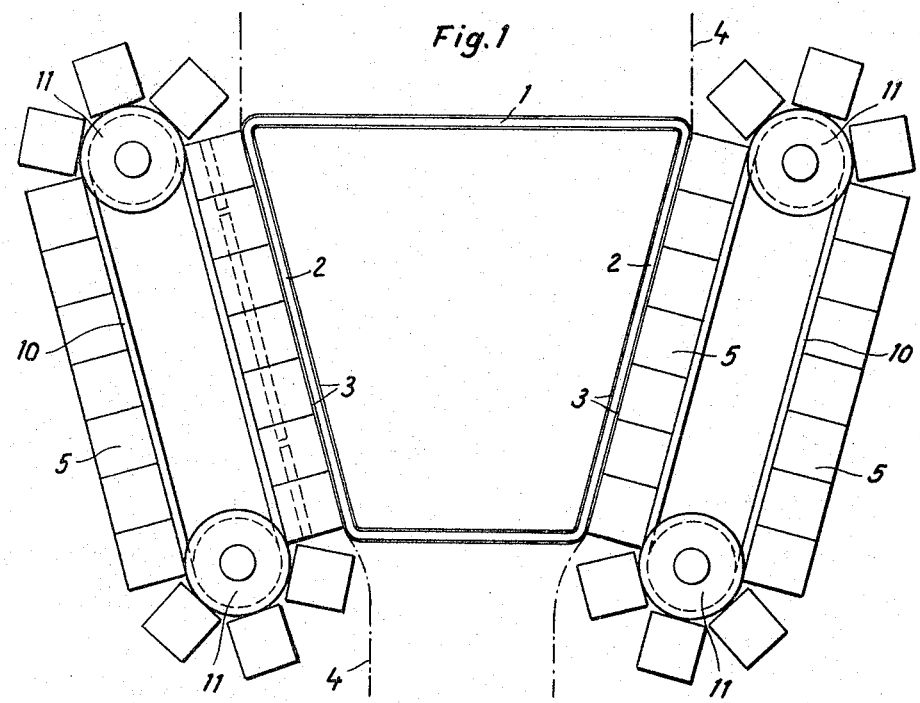
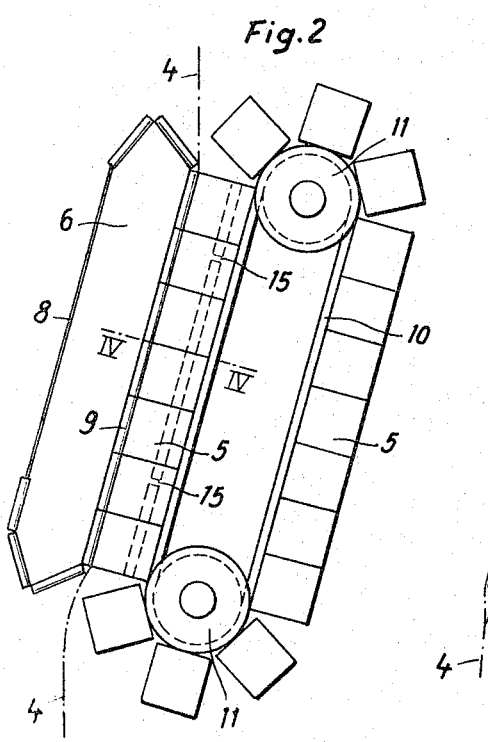
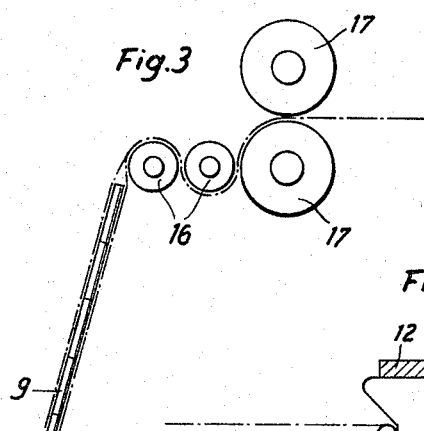
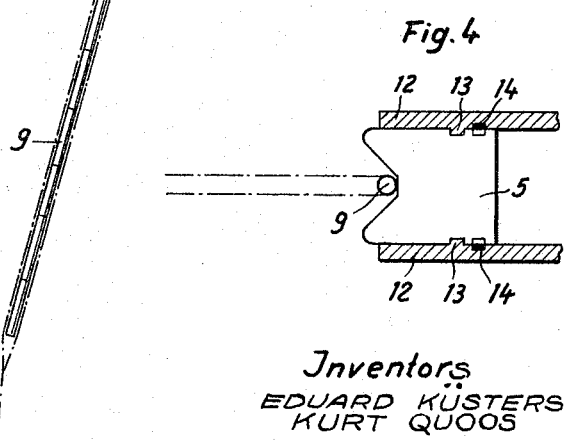
Inventors
EDUARD KÜSTERS
KURT QUOOS
BY
Kenyon & Kenyon
ATTORNEYS Aug. 8, 1967     E. KÜSTERS ET AL     3,334,391
APPARATUS FOR STRETCHING TUBULAR ARTICLES
Filed Sept. 3, 1964     2 Sheets-Sheet 2
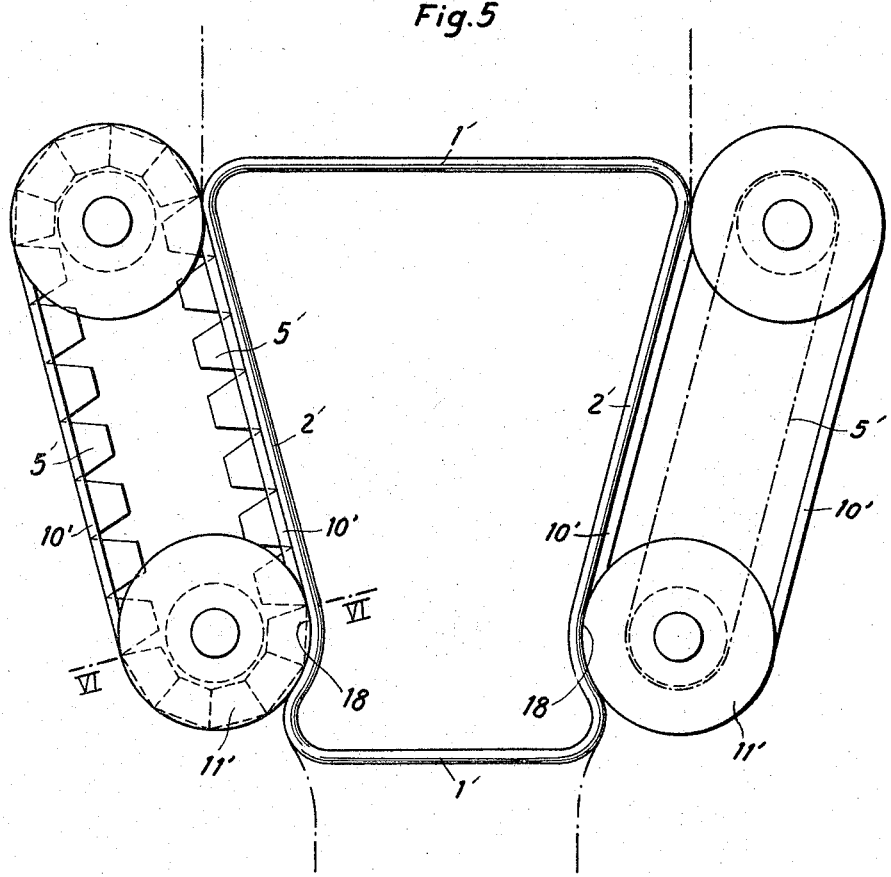
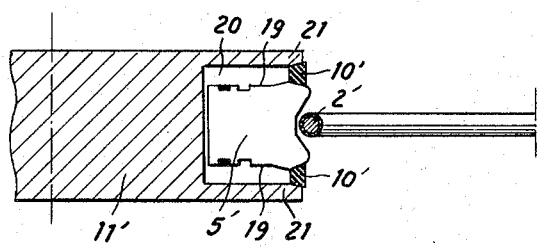
Inventors
EDUARD KÜSTERS
KURT QUOOS
BY
ATTORNEYS

United States Patent Office 3,334,391
Patented Aug. 8, 1967

3,334,391
APPARATUS FOR STRETCHING TUBULAR ARTICLES
Eduard Küsters, Gladbacherstrasse 457, and Kurt Quoos, Bismarckstrasse 74, both of Krefeld, Germany
Filed Sept. 3, 1964, Ser. No. 394,192
6 Claims. (Cl. 26—55)

The invention relates to an apparatus for stretching tubular articles, such as are made from textile materials, of woven or knitted fabric or the like, which consists of oppositely disposed inner guide members over which the tubular article is to be pulled, and which diverge or spread-apart from the entrance side to the exit side, and of followers which engage the tubular article on the outside at side portions thereof corresponding to the inner guides.

It is an object of the invention to provide an apparatus which, while handling the tubular article carefully and substantially without pulling stress, allows the tubular article to stretch widthwise during movement in stretching operation.

To accomplish this operation, outer clinging elements are disposed between the beginning and the end of the inner guides over a certain distance, these clinging elements moving in the same direction and engaging the fabric portion located between them and the inner guides.

Due to the fact the clinging elements travel over a major distance of the stretching path of the article, the stress on the article due to pulling forces during the stretching in the forward direction is reduced, and the article is thus treated in a gentler manner.

As the inner guide a frame may be used which has guide legs which diverge from the entrance and exit while on the outside continuously moving clinging elements on an endless belt or similar means are arranged, which have one side directed like the guide legs of the inner frame and having a larger friction coefficient than the guide legs of the inner frame.

The guide legs of the inner frame may be provided with a slide coating, for example a coating of polytetrafluoroethylene (Teflon).

The inner frame or each guide leg of the inner frame has preferably a magnetically attractable core and the clinging elements on each side consist of electromagnets which move as an endless chain, with the closing of an electric current circuit at the beginning of the stretching path and an opening of the circuit at the end of the stretching path. It is recommended to supply an increased voltage to the electromagnets at the beginning and at the end of the stretching path in order to increase the attracting force of the magnets.

The electromagnets slide appropriately over the operating distance between contact rails for the current supply so that the electromagnets are supplied with current as they enter the working path and are cut off from the current upon leaving the working path.

It is also an advantage if the contact rails end before the turns of the endlessly moving electromagnets and before the ends of the inner guide legs on the entrance side and on the exit side. In this manner the electromagnets make contact only after having rounded the turns on the entrance side and they release the tubular article before entering the turns at the exit side.

The electromagnets or clinging elements moving as an endless train are preferably guided parallel to the inner guide legs in their longitudinal directions.

The longitudinal guides which assure the spacing of the electromagnets from the inner guide legs terminate before the turns of the electromagnets on the entrance side and on the exit side, so that the guides do not interfere with the release of the electromagnets from the inner guides or the tubular article.

A particular embodiment of the invention consists in that as an inner guide a chain link of magnetically attractable elements is provided on opposite sides in endless loop form and moving on the outside as an endless chain, with a guiding action which diverges from the entrance side to the exit side. In this embodiment the inner guide consists of loops which are inserted on opposite sides into the tubular article, the elements of the loops being supported by magnetic force which is effective through the tubular article from the outside in the required diverging position which produces the stretching action.

The magnetically attractable elements may be arranged on a band which forms an endless loop, or on a rope or the like. In this case the band or rope is preferably of a synthetic material, especially a synthetic material having good sliding properties, such as polytetrafluoroethylene.

It is an advantage to provide the endless band or rope loop only over a portion of its length with magnetically attractable elements. This prevents clamping of the elements and facilitates their passing through the loop turns in slipping through the magnetically attractable elements which can have the form of hollow cylindrical rods.

It is recommended that the frame serving as an inner guide recedes on the entrance side of the tubular article opposite the lower cross-legs on opposite sides thereof in an arcuate form whose center of curvature coincides with the axis of the associated pulleys, and that the pulleys engage into the receding arcuate configuration.

For this purpose the pulleys have a circumferential recess into which the magnetic bodies can enter, and the magnetic bodies are attached on opposite sides with their ends facing the guide frame on wedge or cone belts which bear with their side turned away from the magnet bodies against the inner side of the flanges defining the circumferential recess of the pulley.

In this manner a better engagement of the pulleys is produced.

Additional features and advantages of the invention will become apparent from the following description taken in connection with the accompanying drawings in which:
FIGURE 1 shows a first embodiment in front view;
FIGURE 2 shows one half of a second embodiment;
FIGURE 3 shows the magnetically attractable elements as inner guide according to the embodiment of FIGURE 2 for engaging the outer electromagnets, seen from the inside;
FIGURE 4 is a section along line IV—IV of FIGURE 2;
FIGURE 5 illustrates an additional embodiment in front view;
FIGURE 6 is a section along line VI—VI of FIGURE 5.

The embodiments shown are designed particularly for a vertical arrangement of the apparatus.

In the embodiment of FIGURE 1 an inner guide frame 1 is shown and provided with side legs 2 which diverge upwardly. The guide frame consists of iron and is provided with a coating 3 of a synthetic material, which has particularly good sliding properties, such as a coating of polytetrafluoroethylene. The coating can be very thin. Before the beginning of the working operation the frame is set into the tubular article of a woven or knitted fabric, and is located between the outer clinging elements 5.

The embodiment according to FIGURE 2 shows instead of an inner guide frame two endless loops 6 with magnetically attractable elements 9. Each endless loop takes the place of a side leg 2 of the guide frame of FIGURE 1. In FIGURE 2, only one-half of the apparatus is shown. The loops 6 consist of cords or ropes 8 which are of an endless form or assembled into this form and made of polytetrafluoroethylene, the cords being provided over a portion of their length with hollow cylindrical rods 9 of iron. In FIGURE 3 the hollow cylindrical rods 9 which bear against the outer clinging elements during the working operation are seen from the inside, and the tubular article 4 is also shown. Numeral 16 indicates the guide rollers while numeral 17 designates the squeezing rollers.

In these two embodiments the outer clinging elements constitute electromagnets which are mounted, for example, on rotating endless wedge belts 10, and thus form on each of the two sides of the apparatus an endless chain. The wedge belts are guided over belt pulleys 11 which are driven synchronously or separately. The drive means are not shown in the drawing. Similarly the support frame of the belt pulleys is not shown.

The electromagnets 5 slide on the side facing the inner guides between the guide plates 12 which have guide ribs 13 on the sides facing each other. The guide ribs 13 engage in side grooves of the electromagnets. The side grooves may be slightly enlarged at the forward ends in order that they may fit more easily on the ribs. A similar enlargement can also be provided at the trailing ends of the grooves. The rib ends may narrow down or similarly have a conical form. The ribs 13 terminate before the turns of the electromagnets on the entrance side and on the exit side.

At the inner sides of the guide plates 12 contact bars or rails 14 are provided which are interrupted before the turns at 15, i.e. before the ends of the inner guides on the entrance side and on the exit side, whereby the changeover to a higher voltage for the electromagnets at both ends of the apparatus is possible.

In the embodiment of FIGURE 5, as in the embodiment of FIGURE 1, the inner guide frame is designated by numeral 1' and its upwardly diverging side legs are indicated by numeral 2'. The inner guide frame 1' has on the entrance side of the woven or knitted tubular article opposite its lower cross-leg, a curvilinear indentation 18 on opposite sides. The center of curvature of the indentation arc lies in the axis of the pulleys 11'. The magnetic bodies 5' are mounted with their ends facing the guide frame 1' on wedge belts 10' which engage opposite sides 19 of the bodies as shown in FIG. 6. The pulleys 11' (FIGURE 6) show a circumferential recess 20 into which the magnetic bodies 5' reach, and the wedge belts bear with their sides directed away from the magnetic bodies 5' against the inner side of the flanges 21 defining the recess 20. The guide plates of the magnetic bodies 5' along the straight side legs 2' of the guide frame are formed as shown in FIGURE 4. The current supply is carried out also as indicated in FIGURE 4. The magnetic bodies have furthermore the form of equal sided trapezoids so that they bear against each other always with the sides facing the guide frame and form on this side a closed linear train. This form of the magnetic bodies may also be employed in the embodiments according to FIGURES 1 and 2. On the slip-off side the pulleys are formed in the same manner.

The arrangement of the magnetic bodies at the right side of FIGURE 5, is the same as that on the left side thereof.

The structural form of the stretching apparatus according to FIGURES 5 and 6 provides a better engagement with the pulleys 11'.

What is claimed is:

1. An apparatus for stretching tubular articles comprising of two spaced, opposed and planar arranged guides adapted to be slipped into a tubular article to be stretched, said guides constituting an inner frame and arranged in diverging relation from the entrance end to the exit end thereof, feed means for advancing a tubular article along each of said guides, said means comprising clinging elements arranged throughout each outer surface and movable therealong, said clinging elements for each outer surface being mounted on an endless belt to provide a work path along each guide, said clinging elements exerting frictional force on said article therebetween to feed the article along said guides, said guides of the inner frame being magnetically attractable, said clinging elements comprising electromagnets and rotating as endless chains, contact rails for supplying electric current to said electromagnets, said electromagnets sliding in their working path between said rails, and certain of said rails positioned at the beginning of each work path and end of each work path to provide an increased voltage to the electromagnets to increase the attractive force of the magnets.

2. Apparatus according to claim 1, wherein the contact rails terminate adjacent the turns of the endlessly rotating electromagnets.

3. An apparatus for stretching tubular articles comprising of two spaced, opposed and planar arranged guides adapted to be slipped into a tubular article to be stretched, said guides constituting an inner frame and arranged in diverging relation from the entrance end to the exit end thereof, feed means for advancing a tubular article along each of said guides, said means comprising clinging elements arranged throughout each outer surface and movable therealong, said clinging elements for each outer guide being mounted on an endless belt to provide a work path along each guide, said clinging elements cooperating with said guide frictional force on said article therebetween to feed the article along said guides, each of said guides comprising a linked chain formed of magnetically attractable members arranged in an endless loop, and clinging elements comprising electromagnets arranged in endless chains having guide members which diverge from the entrance end to the exit end, said magnetically attractable members being secured to a band of polytetrafluoroethylene, and means for supplying electric current to said electromagnets.

4. Apparatus according to claim 3, wherein each endless band loop is provided with magnetically attractable elements only over a part of the length thereof.

5. Apparatus according to claim 3 wherein the magnetically attractable elements comprise hollow cylindrical rods.

6. An apparatus for stretching tubular articles comprising of two spaced, opposed and planar arranged guides adapted to be slipped into a tubular article to be stretched, said guides constituting an inner frame and arranged in diverging relation from the entrance end to the exit end thereof, feed means for advancing a tubular article along each of said guides, said means comprising clinging elements arranged throughout each outer surface and movable therealong, said clinging elements for each outer surface being mounted on an endless belt to provide a work path along each guide, said clinging elements cooperating with said guides to exert frictional force on an article therebetween to feed the article along said guides, each of said guides comprising a linked chain formed of magnetically attractable members arranged in an endless loop, said clinging elements comprise electromagnets arranged in endless chains having guide members which diverge from the entrance end to the exit end, and means for supplying electric current to said electromagnets.

References Cited

UNITED STATES PATENTS

| 2,507,599 | 5/1950 | Johnson | 26—55 |
| 2,598,451 | 5/1952 | Simpson | 226—93 |
| 2,623,263 | 12/1952 | Dungler | 26—55 |
| 2,681,324 | 6/1954 | Hechberg. | |

FOREIGN PATENTS 15,957 of 1908 Great Britain.

ROBERT R. MACKEY, *Primary Examiner.*